US012581569B2

(12) United States Patent
Park et al.

(10) Patent No.: US 12,581,569 B2
(45) Date of Patent: Mar. 17, 2026

(54) METHOD FOR SUPPORTING SERVICE CONTINUITY WHEN DISASTER SITUATION ENDS, AND DEVICE SUPPORTING SAME

(71) Applicant: LG Electronics Inc., Seoul (KR)

(72) Inventors: Sangmin Park, Seoul (KR); Sungduck Chun, Seoul (KR); Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 317 days.

(21) Appl. No.: 18/225,445

(22) Filed: Jul. 24, 2023

(65) Prior Publication Data

US 2023/0371125 A1 Nov. 16, 2023

Related U.S. Application Data

(63) Continuation of application No. 18/093,598, filed on Jan. 5, 2023, now Pat. No. 11,751,281, which is a
(Continued)

(30) Foreign Application Priority Data

Jul. 13, 2020 (KR) ........................ 10-2020-0086314

(51) Int. Cl.
*H04W 76/50* (2018.01)
*H04W 36/14* (2009.01)

(52) U.S. Cl.
CPC ....... *H04W 76/50* (2018.02); *H04W 36/1446* (2023.05)

(58) Field of Classification Search
CPC ... H04W 76/50; H04W 36/1446; H04W 8/12; H04W 36/385; H04W 60/06;
(Continued)

(56) References Cited

U.S. PATENT DOCUMENTS 12,256,322 B2 * 3/2025 Jeong .................... H04W 60/00
12,375,987 B2 * 7/2025 Watfa .................... H04W 76/50
(Continued)

FOREIGN PATENT DOCUMENTS

CN       101051883 A       10/2007
CN       101720080 A       6/2010
(Continued)

OTHER PUBLICATIONS

3GPP, "3rd Generation Partnership Project; Technical Specification Group Core Network and Terminals; Study on the support for minimization of service interruption; (Release 17)," 3GPP TR 24.811 V1.1.0, Mar. 2021, 99 pages.
(Continued)

*Primary Examiner* — Kabir A Timory
(74) *Attorney, Agent, or Firm* — Fish & Richardson P.C.

(57) ABSTRACT

Provided are a method for supporting service continuity when a disaster situation ends, and a device supporting same. A user equipment (UE) receives, from a disaster roaming PLMN, a configuration update command message including information indicating that a disaster condition of a home PLMN (HPLMN) has ended. The UE waits until a service that is being received from the disaster roaming PLMN ends, and performs, after the service that is being received from the disaster roaming PLMN ends, a procedure of deregistration from the disaster roaming PLMN on the basis of information indicating that the disaster condition of the HPLMN has ended.

9 Claims, 10 Drawing Sheets

Related U.S. Application Data continuation of application No. PCT/KR2021/008866, filed on Jul. 12, 2021.

(58) Field of Classification Search
CPC ..... H04W 48/02; H04W 48/16; H04W 48/18; H04W 60/04; H04W 4/90; H04W 36/14; H04W 8/02; H04W 84/042
See application file for complete search history.

(56) References Cited

U.S. PATENT DOCUMENTS

| | | |
|---|---|---|
| 2019/0357129 A1 | 11/2019 | Park et al. |
| 2022/0248304 A1* | 8/2022 | Guttman ............... H04W 48/10 |

FOREIGN PATENT DOCUMENTS

| | | |
|---|---|---|
| CN | 106302077 A | 1/2017 |
| JP | 2015-015562 | 1/2015 |
| WO | WO 2019/197589 | 10/2019 |
| WO | WO 2019/221033 | 11/2019 |
| WO | WO 2020/003576 A1 | 1/2020 |
| WO | WO 2022/014980 A1 | 1/2022 |
| WO | WO 2022/151413 A1 | 7/2022 |

OTHER PUBLICATIONS

Extended European Search Report in European Appln. No. 21843161. 7, mailed on Jul. 5, 2024, 16 pages.
Office Action in Japanese Appln. No. 2023-501822, mailed on Jan. 9, 2024, 6 pages (with English translation).
Notice of Allowance in Korean Appln. No. 10-2022-7045530, mailed on Feb. 28, 2024, 5 pages (with English translation).
Office Action in Chinese Appln. No. 202180060865.5, mailed on Jun. 11, 2025, 9 pages (with English translation).

* cited by examiner

Figure 3:
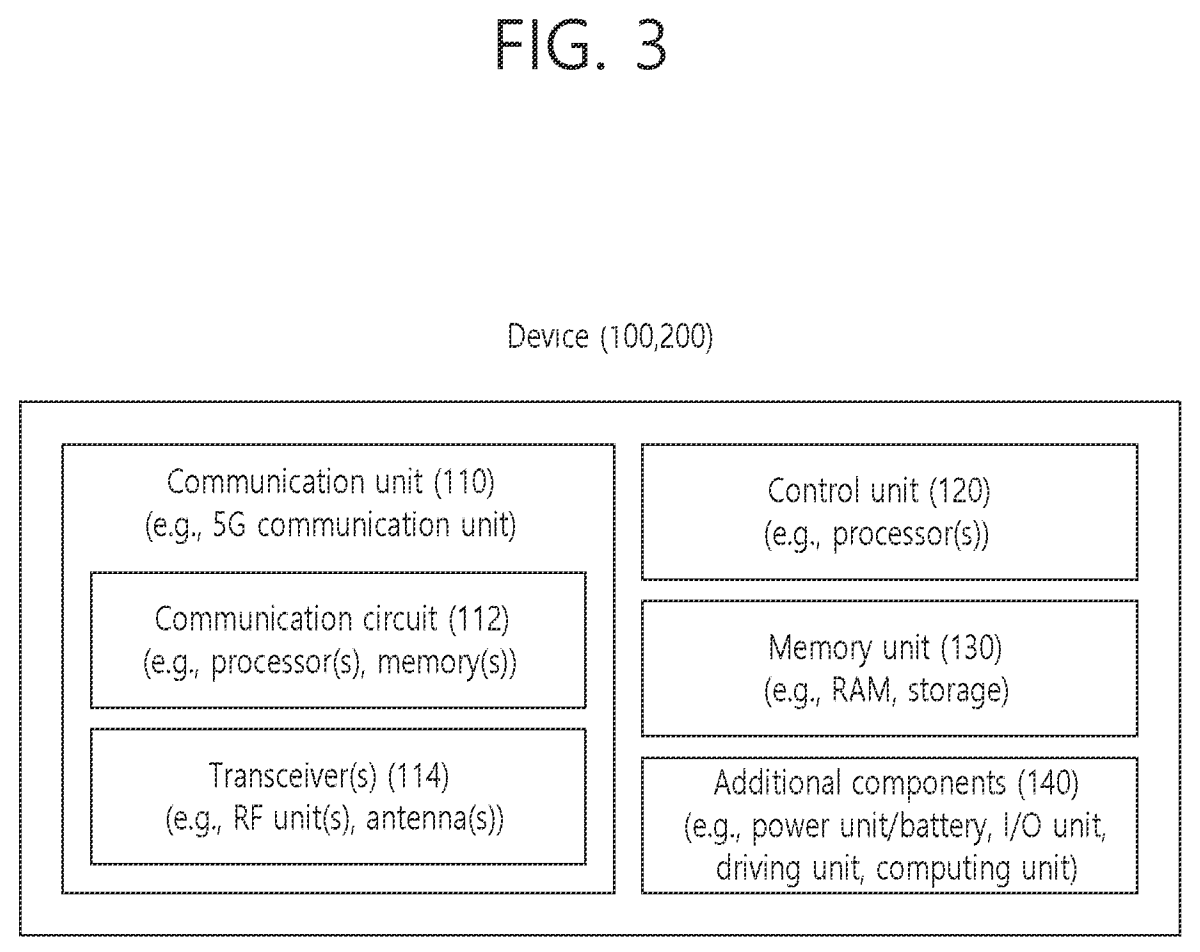

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

Figure 6:
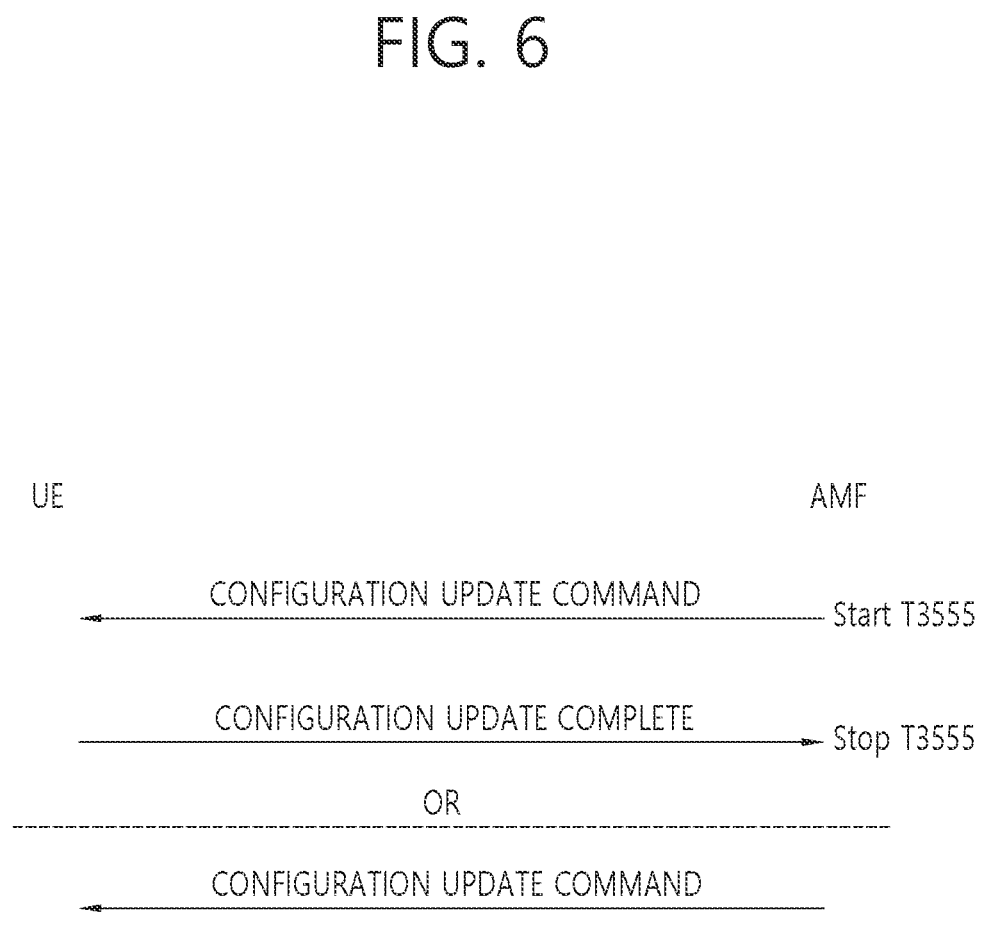

UE                                              AMF

CONFIGURATION UPDATE COMMAND      Start T3555

CONFIGURATION UPDATE COMPLETE      Stop T3555

OR

CONFIGURATION UPDATE COMMAND

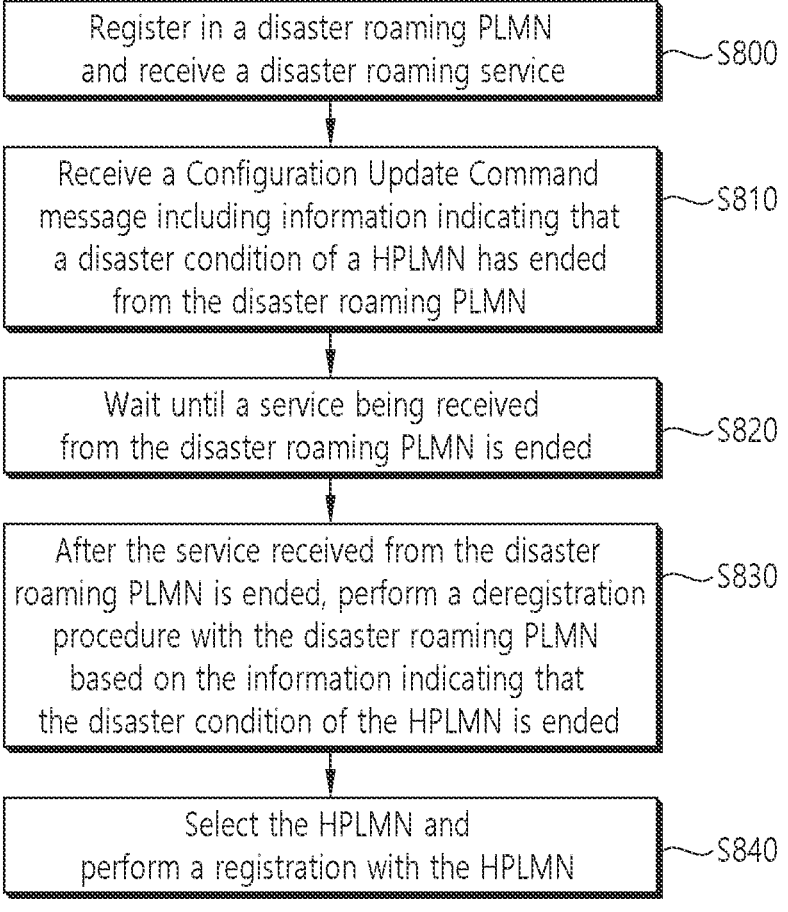

Register in a disaster roaming PLMN
and receive a disaster roaming service ~S800

Receive a Configuration Update Command
message including information indicating that
a disaster condition of a HPLMN has ended
from the disaster roaming PLMN ~S810

Wait until a service being received
from the disaster roaming PLMN is ended ~S820

After the service received from the disaster
roaming PLMN is ended, perform a deregistration
procedure with the disaster roaming PLMN
based on the information indicating that
the disaster condition of the HPLMN is ended ~S830

Select the HPLMN and
perform a registration with the HPLMN ~S840

METHOD FOR SUPPORTING SERVICE CONTINUITY WHEN DISASTER SITUATION ENDS, AND DEVICE SUPPORTING SAME

CROSS-REFERENCE TO RELATED APPLICATIONS

This application is a continuation of U.S. application Ser. No. 18/093,598, filed on Jan. 5, 2023, which is a pursuant to 35 U.S.C. § 119 (e) continuation of International Application PCT/KR2021/008866, with an international filing date of Jul. 12, 2021, which claims the benefit of Korean Patent Application No. 10-2020-0086314, filed on Jul. 13, 2020, the contents of which are hereby incorporated by reference herein in their entirety.

TECHNICAL FIELD

The present disclosure relates to a method for supporting service continuity at the end of a disaster situation and an apparatus for supporting the same.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Mobile communication service is becoming an indispensable service in daily life, and communication operators are making various attempts to prevent service interruption. For example, a communication operator may install multiple wired networks in a core network section (e.g., multiple wired networks between core network nodes), and even if a problem occurs in one wired network, communication services may be continuously provided using another wired network. Alternatively, a communication operator may install a plurality of core network nodes, such as AMF, so that even if a problem occurs in one core network node, other core network nodes perform backup to prevent communication services from being disconnected.

However, in the event of a disaster such as fire or earthquake, the above countermeasures may not be helpful.

For example, in the event of a fire, all communication networks connected to the outside from one node of the wireless network may be lost. In addition, in a virtualized cloud environment, a plurality of core network nodes is likely to be installed in one data center located in the same region. Therefore, if a fire or an earthquake occurs in an area where a data center is located, there is a high possibility that functions of all core network nodes will be lost no matter how many core network nodes are installed.

SUMMARY

When a communication service through a network of a specific operator is not possible due to a disaster, a method of minimizing service interruption by temporarily roaming a subscriber of the operator to a network of another operator in the vicinity is being discussed. In this case, if the UE receiving the disaster roaming service returns to the original network as soon as the disaster situation ends, a problem in that the currently received service may suddenly stop may occur.

In an aspect, a method performed by a user equipment (UE) operating in a wireless communication system is provided. The method includes receiving a Configuration Update Command message including information indicating that a disaster condition of a Home PLMN (HPLMN) has ended from a disaster roaming PLMN, waiting until a service being received from the disaster roaming PLMN is ended, after the service received from the disaster roaming PLMN is ended, performing a deregistration procedure with the disaster roaming PLMN based on the information indicating that the disaster condition of the HPLMN is ended.

In another aspect, an apparatus for implementing the above method is provided.

The present disclosure can have various advantageous effects.

For example, when a disaster situation ends, a UE that has been using disaster roaming from a disaster roaming communication network can return to the original communication network after normally ending the ongoing service without interruption, thereby improving the user experience of the UE.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 2 shows an example of wireless devices to which implementations of the present disclosure is applied.

FIG. 3 shows an example of a wireless device to which implementations of the present disclosure is applied.

FIG. 5 shows an example of 5G system architecture to which implementations of the present disclosure is applied.

FIG. 6 shows an example of a UE configuration update procedure to which implementations of the present disclosure is applied.

FIG. 7 shows a concept of MINT to which implementations of the present disclosure is applied.

FIG. 8 shows an example of a method performed by a UE to which implementations of the present disclosure is applied.

DETAILED DESCRIPTION

Figure 4:
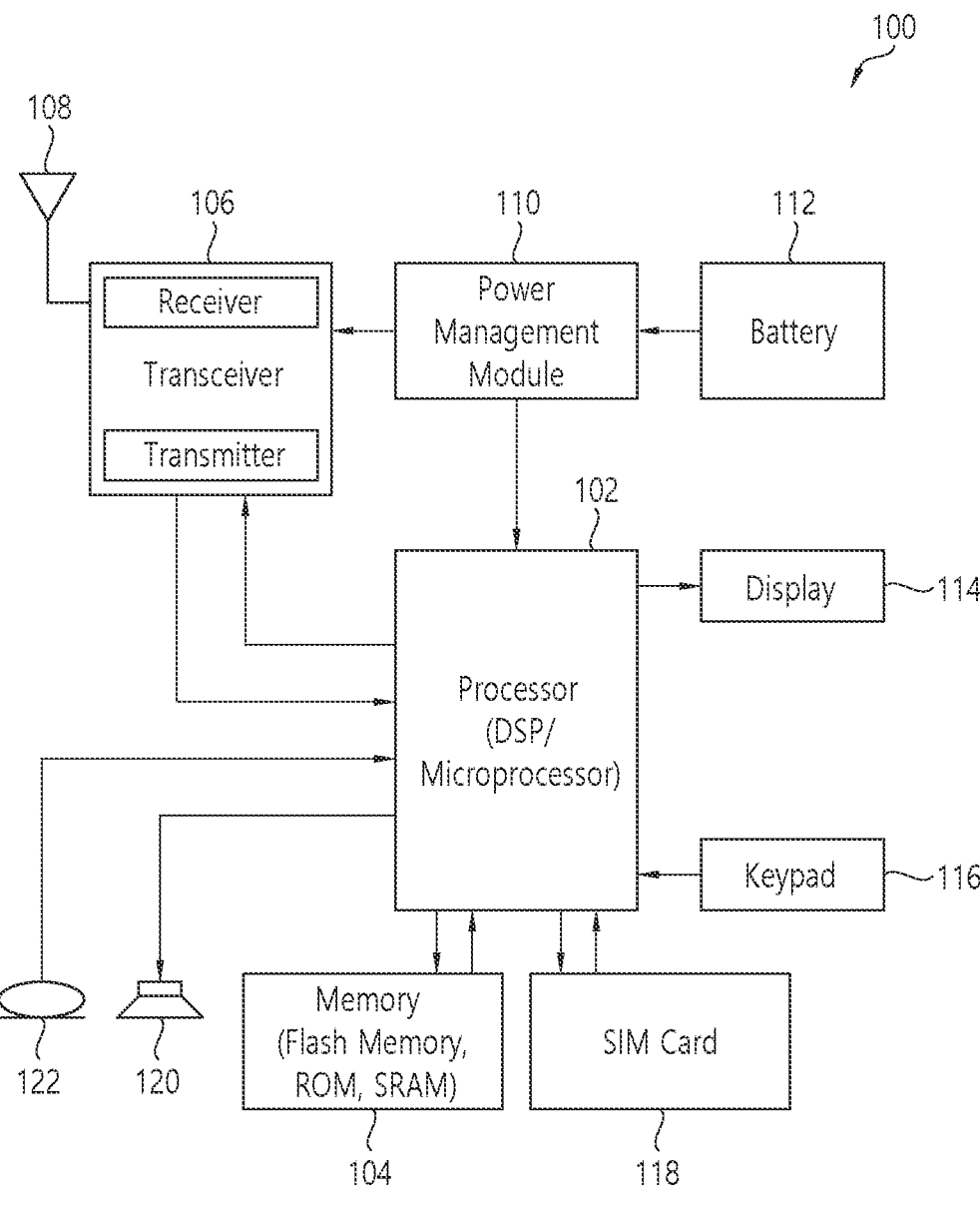
FIG. 4 shows an example of UE to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL.

Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
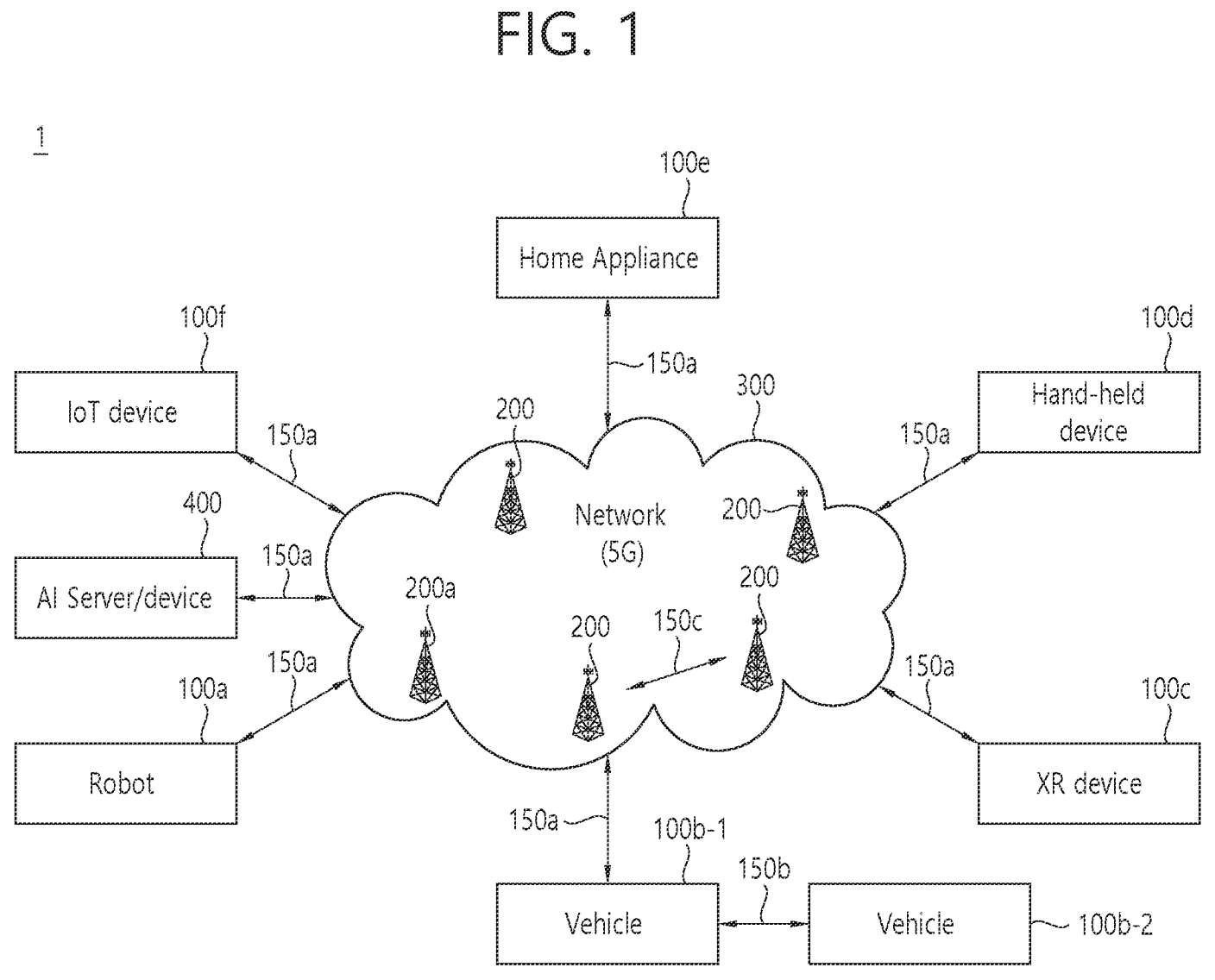

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure. The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 KHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrow band internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names.

Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
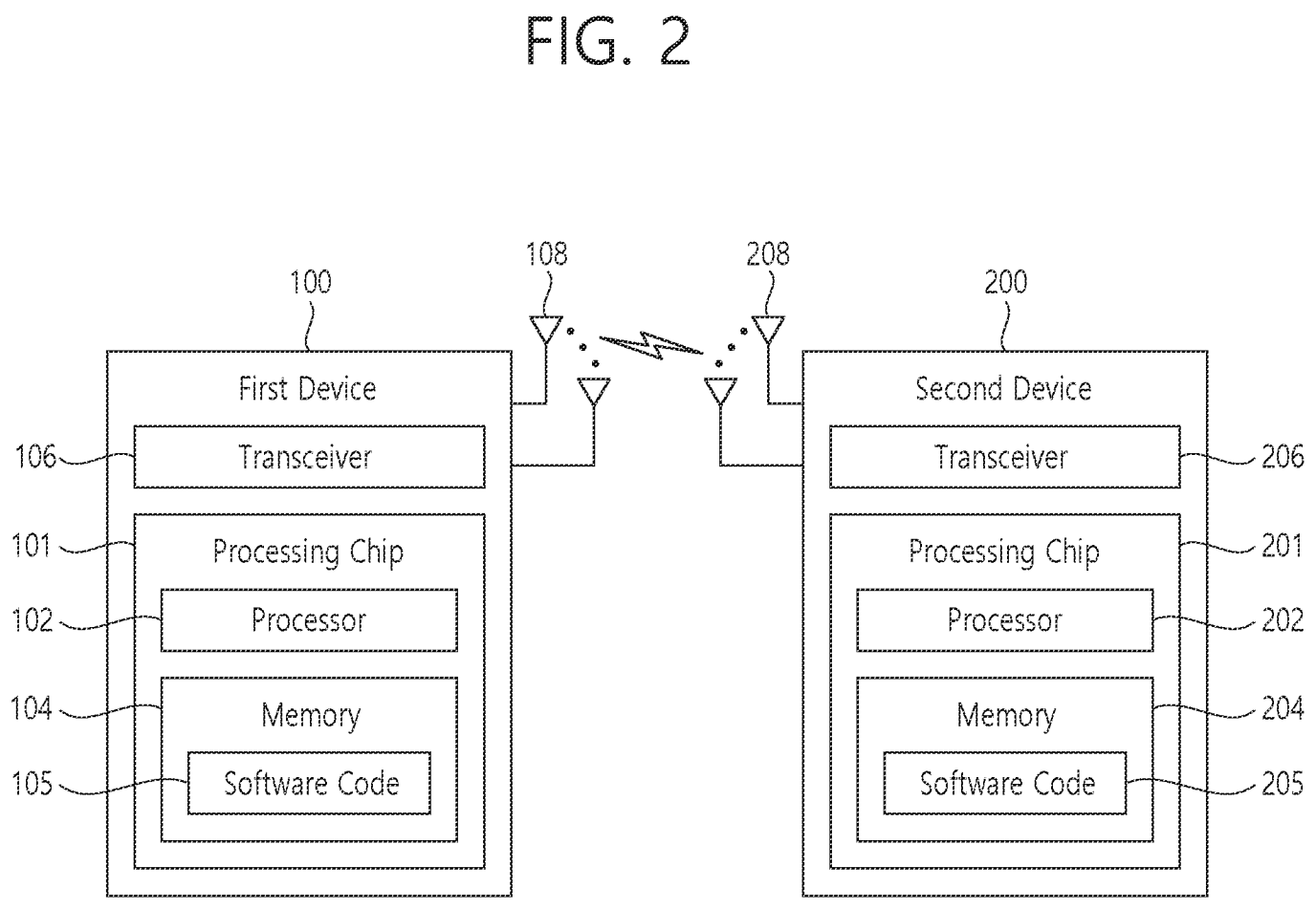

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be adapted to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be adapted to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/ chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be adapted to include the modules, procedures, or functions. Firmware or software adapted to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be adapted to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be adapted to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be adapted to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a dynamic RAM (DRAM), a ROM, a flash memory, a volatile memory, a non-volatile memory, and/or a combination thereof.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be adapted to implement the descriptions, functions, procedures, suggestions, methods and/or operational flowcharts disclosed in the present disclosure. The processor 102 may be adapted to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
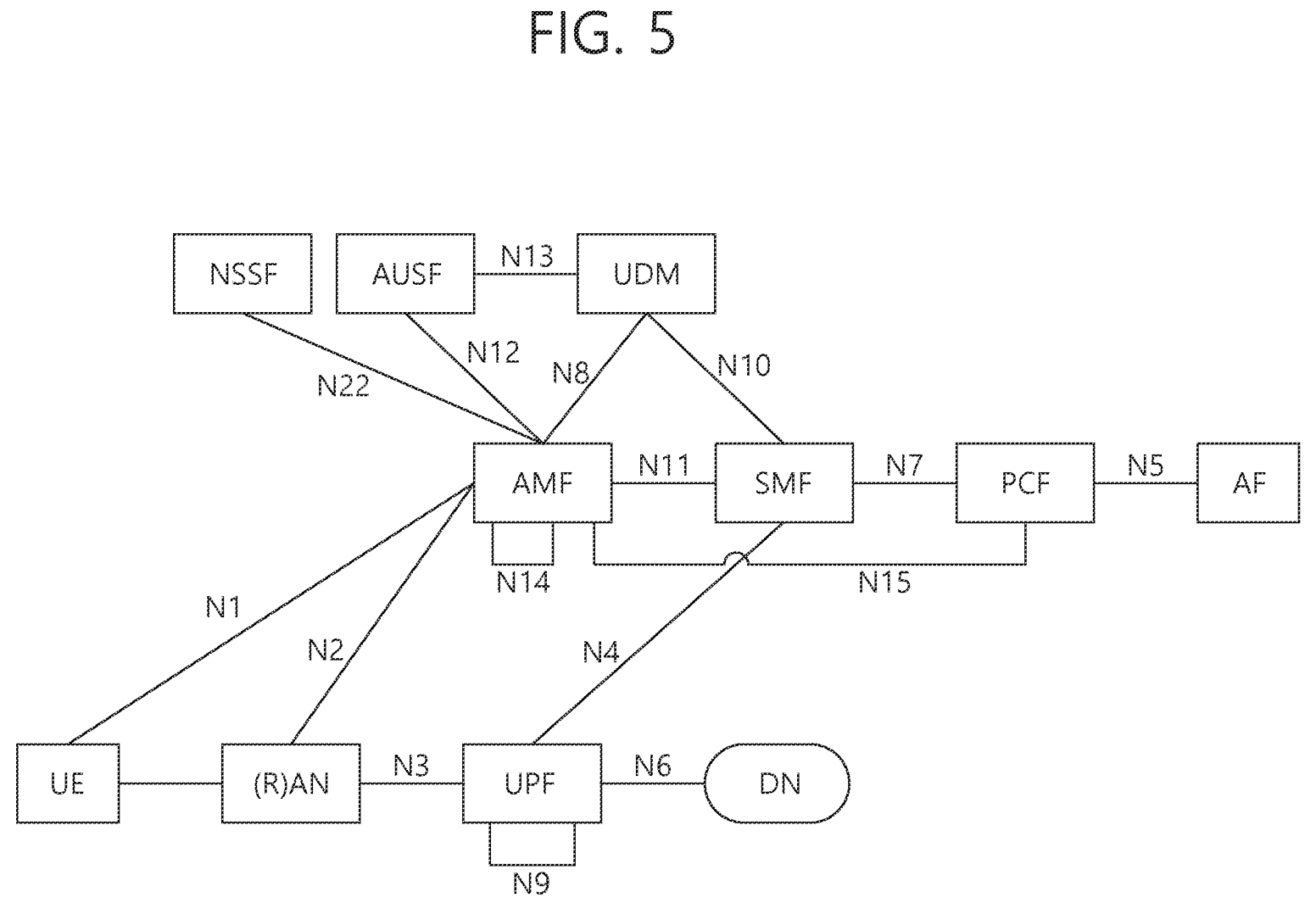

FIG. 5 shows an example of 5G system architecture to which implementations of the present disclosure is applied.

The 5G system (5GS) architecture consists of the following network functions (NF).

Authentication Server Function (AUSF)

Access and Mobility Management Function (AMF)

Data Network (DN), e.g., operator services, Internet access or 3rd party services Unstructured Data Storage Function (UDSF)

Network Exposure Function (NEF)

Intermediate NEF (I-NEF)

Network Repository Function (NRF)

Network Slice Selection Function (NSSF)

Policy Control Function (PCF)

Session Management Function (SMF)

Unified Data Management (UDM)

Unified Data Repository (UDR)

User Plane Function (UPF)

UE radio Capability Management Function (UCMF)

Application Function (AF)

User Equipment (UE)

(Radio) Access Network ((R)AN)

5G-Equipment Identity Register (5G-EIR)

Network Data Analytics Function (NWDAF)

CHarging Function (CHF)

Furthermore, the following network functions may be considered.

Non-3GPP InterWorking Function (N3IWF)

Trusted Non-3GPP Gateway Function (TNGF)

Wireline Access Gateway Function (W-AGF)

FIG. 5 depicts the 5G system architecture in the non-roaming case, using the reference point representation showing how various network functions interact with each other.

In FIG. 5, for the sake of clarity of the point-to-point diagrams, the UDSF, NEF and NRF have not been depicted. However, all depicted Network Functions can interact with the UDSF, UDR, NEF and NRF as necessary.

For clarity, the UDR and its connections with other NFs, e.g., PCF, are not depicted in FIG. 5. For clarity, the NWDAF and its connections with other NFs, e.g., PCF, are not depicted in FIG. 5.

The 5G system architecture contains the following reference points:

N1: Reference point between the UE and the AMF.

N2: Reference point between the (R)AN and the AMF.

N3: Reference point between the (R)AN and the UPF.

N4: Reference point between the SMF and the UPF.

N6: Reference point between the UPF and a Data Network.

N9: Reference point between two UPFs.

The following reference points show the interactions that exist between the NF services in the NFs.

N5: Reference point between the PCF and an AF.

N7: Reference point between the SMF and the PCF.

N8: Reference point between the UDM and the AMF.

N10: Reference point between the UDM and the SMF.

N11: Reference point between the AMF and the SMF.

N12: Reference point between the AMF and the AUSF.

N13: Reference point between the UDM and the AUSF.

N14: Reference point between two AMFs.

N15: Reference point between the PCF and the AMF in the case of non-roaming scenario, PCF in the visited network and AMF in the case of roaming scenario.

N16: Reference point between two SMFs, (in roaming case between SMF in the visited network and the SMF in the home network).

N22: Reference point between the AMF and the NSSF.

In some cases, a couple of NFs may need to be associated with each other to serve a UE.

Hereinafter, a UE configuration update procedure will be described. S5.4.4 of 3GPP TS 24.501 V16.5.0 (2020-06) may be referred. Through the UE configuration update procedure newly introduced in the 5G system, the network can update various parameters and/or configurations of the UE, or can trigger re-registration of the UE.

More specifically, the purpose of the UE configuration update procedure is as follows.

a) allow the AMF to update the UE configuration for access and mobility management-related parameters decided and provided by the AMF by providing new parameter information within the command; or b) request the UE to perform a registration procedure for mobility and periodic registration update towards the network to update access and mobility management-related parameters decided and provided by the AMF This procedure is initiated by the network and may only be used when the UE has an established 5GMM context, and the UE is in 5GMM-CONNECTED mode. When the UE is in 5GMM-IDLE mode, the AMF may use the paging or notification procedure to initiate the UE configuration update procedure. The AMF may request a confirmation response in order to ensure that the parameter has been updated by the UE.

This procedure is initiated by the network to assign a new 5G Global Unique Temporary Identifier (5G-GUTI) to the UE after a successful service request procedure invoked as a response to a paging request from the network and before the release of the N1 NAS signaling connection. If the service request procedure was triggered due to 5GSM downlink signaling pending, the procedure for assigning a new 5G-GUTI may be initiated by the network after the transport of the 5GSM downlink signaling.

The following parameters are supported by the UE configuration update procedure without the need to request the UE to perform the registration procedure for mobility and periodic registration update.

a) 5G-GUTI;

b) Tracking Area Identifier (TAI) list;

c) Service area list;

d) Network identity and time zone information (Full name for network, short name for network, local time zone, universal time and local time zone, network daylight saving time);

e) Local Area Data Network (LADN) information;

f) Rejected Network Slice Selection Assistance Information (NSSAI);

g) Operator-defined access category definitions;

h) Short message Service (SMS) indication;

i) Service gap time value;

j) Closed Access Group (CAG) information list;

k) UE radio capability ID;

l) 5GS registration result; and m) Truncated 5G SAE Temporary Mobile Subscriber Identity (5G-S-TMSI) configuration.

The following parameters may be sent to the UE with or without a request to perform the registration procedure for mobility and periodic registration update.

a) Allowed NSSAI;

b) Configured NSSAI; or c) Network slicing subscription change indication.

The following parameters are sent to the UE with a request to perform the registration procedure for mobility and periodic registration update:

a) Mobile Initiated Connection Only (MICO) indication; or b) UE radio capability ID deletion indication.

The following parameters are sent over 3GPP access only.

a) LADN information;

b) MICO indication;

c) TAI list;

d) Service area list;

e) Service gap time value;

f) CAG information list;

g) UE radio capability ID;

h) UE radio capability ID deletion indication; and i) Truncated 5G-S-TMSI configuration.

The following parameters are managed and sent per access type, i.e., independently over 3GPP access or non-3GPP access.

a) Allowed NSSAI; and b) Rejected NSSAI (when the NSSAI is rejected for the current registration area).

The following parameters are managed commonly and sent over 3GPP access or non-3GPP access.

a) 5G-GUTI;

b) Network identity and time zone information;

c) Rejected NSSAI (when the NSSAI is rejected for the current Public Land Mobile network (PLMN) or rejected for the failed or revoked NSSAA);

d) Configured NSSAI;

e) SMS indication;

f) 5GS registration result.

FIG. 6 shows an example of a UE configuration update procedure to which implementations of the present disclosure is applied.

Referring to FIG. 6, the UE configuration update procedure is initiated when the AMF transmits a configuration update command message to the UE.

The AMF includes in the configuration update command message either:

a) one or more of the following parameters: 5G-GUTI, TAI list, allowed NSSAI that may include the mapped Single NSSAI (S-NSSAI), LADN information, service area list, MICO indication, network identity and time zone information, configured NSSAI that may include the mapped S-NSSAI, rejected NSSAI, network slicing subscription change indication, operator-defined access category definitions, SMS indication, service gap time value, CAG information list, UE radio capability ID, 5GS registration result, UE radio capability ID deletion indication or truncated 5G-S-TMSI configuration;

b) the configuration update indication Information Element (IE) with the registration requested bit set to "registration requested"; or c) a combination of both a) and b).

If an acknowledgement from the UE is requested, the AMF indicates "acknowledgement requested" in the acknowledgement bit of the configuration update indication IE in the configuration update command message and starts timer T3555. Acknowledgement is requested for all parameters except when only network identity and time zone information is included.

To initiate parameter re-negotiation between the UE and network, the AMF indicates "registration requested" in the registration requested bit of the configuration update indication IE in the configuration update command message.

If new allowed NSSAI information or AMF re-configuration of supported S-NSSAIs requires an AMF relocation, the AMF indicates "registration requested" in the registration requested bit of the configuration update indication IE and includes the allowed NSSAI IE in the configuration update command message.

If the AMF includes a new configured NSSAI in the configuration update command message and the new configured NSSAI requires an AMF relocation, the AMF indicates "registration requested" in the registration requested bit of the configuration update indication IE in the configuration update command message.

If the configuration update command message is initiated only due to changes to the allowed NSSAI and these changes require the UE to initiate a registration procedure, but the AMF is unable to determine an allowed NSSAI for the UE, then the configuration update command message indicates "registration requested" in the registration requested bit of the configuration update indication IE, and does not contain any other parameters.

If a Network Slice-Specific Authentication and Authorization (NSSAA) procedure for an S-NSSAI is:

a) completed as a success, the AMF includes this S-NSSAI in the allowed NSSAI; or b) completed as a failure, the AMF includes this S-NSSAI in the rejected NSSAI for the failed or revoked NSSAA with the reject cause "S-NSSAI not available due to the failed or revoked network slice-specific authentication and authorization".

If authorization is revoked for an S-NSSAI that is in the current allowed NSAAI for an access type, the AMF performs the following.

a) provide a new allowed NSSAI to the UE, excluding the S-NSSAI for which authorization is revoked; and b) provide a new rejected NSSAI for the failed or revoked NSSAA, including the S-NSSAI in the rejected NSSAI for which the authorization is revoked, with the reject cause "S-NSSAI is not available due to the failed or revoked network slice-specific authorization and authentication".

The allowed NSSAI and the rejected NSSAI are included in the configuration update command message to reflect the result of the procedures subject to NSSAA.

If the AMF includes the network slicing indication IE in the configuration update command message with the network slicing subscription change indication set to "Network slicing subscription changed", and changes to the allowed NSSAI require the UE to initiate a registration procedure, but the AMF is unable to determine an allowed NSSAI for the UE, then the configuration update command message additionally indicates "registration requested" in the registration requested bit of the configuration update indication IE and does not include an allowed NSSAI.

If the AMF needs to update the LADN information, the AMF includes the LADN information in the LADN information IE of the configuration update command message.

If the AMF needs to update the CAG information list, the AMF includes the CAG information list IE in the configuration update command message. If the AMF needs to update the CAG information list and:

a) the UE has an emergency PDU session; and b-1) the UE is in a CAG cell and none of the CAG-ID(s) supported by the CAG cell is included in the allowed CAG list for the current PLMN in the updated CAG information list; or b-2) the UE is in a non-CAG cell and the entry for the current PLMN in the updated CAG information list includes an indication that the UE is only allowed to access 5GS via CAG cells;

the AMF indicates to the SMF to perform a local release of all non-emergency PDU sessions associated with 3GPP access.

If the AMF needs to update the truncated 5G-S-TMSI configuration for a UE in NB-N1 mode using control plane Cellular IoT (CIoT) 5GS optimization, the AMF includes the truncated 5G-S-TMSI configuration IE in the configuration update command message.

During an established 5GMM context, the network may send one or more configuration update command messages to the UE. If more than one configuration update command message is sent, the messages need not have the same content.

Upon receiving the configuration update command message, the UE stops timer T3346 if running and uses the contents to update appropriate information stored within the UE.

If "acknowledgement requested" is indicated in the acknowledgement bit of the configuration update indication IE in the configuration update command message, the UE sends a configuration update complete message.

If the UE receives a new 5G-GUTI in the configuration update command message, the UE considers the new 5G-GUTI as valid, the old 5G-GUTI as invalid, stops timer T3519 if running, and deletes any stored Subscription Concealed Identifier (SUCI). Otherwise, the UE considers the old 5G-GUTI as valid. The UE provides the 5G-GUTI to the lower layer of 3GPP access if the configuration update command message is sent over the non-3GPP access, and the UE is in 5GMM-REGISTERED in both 3GPP access and non-3GPP access in the same PLMN.

If the UE receives a new TAI list in the configuration update command message, the UE considers the new TAI list as valid and the old TAI list as invalid. Otherwise, the UE considers the old TAI list as valid.

If the UE receives a new truncated 5G-S-TMSI configuration in the configuration update command message, the UE considers the new truncated 5G-S-TMSI configuration as valid and the old truncated 5G-S-TMSI configuration as invalid. Otherwise, the UE considers the old truncated 5G-S-TMSI configuration as valid.

If the UE receives a new service area list in the configuration update command message, the UE considers the new service area list as valid and the old service area list as invalid. Otherwise, the UE considers the old service area list, if any, as valid.

If the UE receives new network ID and time zone information in the configuration update command message, the UE considers the new network ID and time zone information as valid and the old NITZ information as invalid. Otherwise, the UE considers the old network ID and time zone information as valid.

If the UE receives a LADN information IE in the configuration update command message, the UE considers the old LADN information as invalid and the new LADN information as valid, if any. Otherwise, the UE considers the old LADN information as valid.

If the UE receives a new allowed NSSAI for the associated access type in the configuration update command message, the UE considers the new allowed NSSAI as valid for the associated access type, stores the allowed NSSAI for the associated access type and consider the old allowed NSSAI for the associated access type as invalid. Otherwise, the UE considers the old allowed NSSAI as valid for the associated access type.

If the UE receives a new configured NSSAI in the configuration update command message, the UE considers the new configured NSSAI for the registered PLMN as valid and the old configured NSSAI for the registered PLMN as invalid. Otherwise, the UE considers the old configured NSSAI for the registered PLMN as valid. The UE stores the new configured NSSAI.

If the UE receives the network slicing indication IE in the configuration update command message with the network slicing subscription change indication set to "Network slicing subscription changed", the UE deletes the network slicing information for each and every PLMN except for the current PLMN.

If the UE receives operator-defined access category definitions IE in the configuration update command message and the operator-defined access category definitions IE contains one or more operator-defined access category definitions, the UE deletes any operator-defined access category definitions stored for the Registered PLMN (RPLMN) and stores the received operator-defined access category definitions for the RPLMN. If the UE receives the operator-defined access category definitions IE in the configuration update command message and the operator-defined access category definitions IE contains no operator-defined access category definitions, the UE deletes any operator-defined access category definitions stored for the RPLMN. If the configuration update command message does not contain the operator-defined access category definitions IE, the UE does not delete the operator-defined access category definitions stored for the RPLMN.

If the UE receives the SMS indication IE in the configuration update command message with the SMS availability indication set to:

a) "SMS over NAS not available": The UE considers that SMS over NAS transport is not allowed by the network; and b) "SMS over NAS available": The UE may request the use of SMS over NAS transport by performing a registration procedure for mobility and periodic registration update, after the completion of the UE configuration update procedure.

If the UE receives the CAG information list IE in the configuration update command message, the UE deletes any stored CAG information list and, if the value part of the CAG information list IE is non-empty, stores the CAG information list received in the CAG information list IE.

If the received CAG information list includes an entry containing the identity of the current PLMN, the UE operates as follows:

a) If the UE receives the configuration update command message via a CAG cell, the entry for the current PLMN in the received CAG information list does not include any of the CAG-IDs supported by the current CAG cell, and:

1) the entry for the current PLMN in the received CAG information list does not include an indication that the UE is only allowed to access 5GS via CAG cells, then the UE enters the state 5GMM-REGISTERED.LIMITED-SERVICE and searches for a suitable cell with the updated CAG information list; or 2) the entry for the current PLMN in the received CAG information list includes an indication that the UE is only allowed to access 5GS via CAG cells and:

i) if the entry for the current PLMN in the received CAG information list includes one or more CAG-IDs, the UE enters the state 5GMM-REGISTERED.LIMITED-SERVICE and searches for a suitable cell with the updated CAG information list; or ii) if the entry for the current PLMN in the received CAG information list does not include any CAG-ID and:

A) the UE does not have an emergency PDU session, then the UE enters the state 5GMM-DEREGISTERED.PLMN-SEARCH and applies the PLMN selection process with the updated CAG information list; or B) the UE has an emergency PDU session, then the UE performs a local release of all PDU sessions associated with 3GPP access except for the emergency PDU session; or b) If the UE receives the configuration update command message via a non-CAG cell and the entry for the current PLMN in the received CAG information list includes an indication that the UE is only allowed to access 5GS via CAG cells and:

1) if the allowed CAG list for the current PLMN in the received CAG information list includes one or more CAG-IDs, the UE enters the state 5GMM-REGISTERED.LIMITED-SERVICE and searches for a suitable cell with the updated CAG information list; or 2) if the entry for the current PLMN in the received CAG information list does not include any CAG-ID and:

i) the UE does not have an emergency PDU session, then the UE enters the state 5GMM-DEREGISTERED.PLMN-SEARCH and applies the PLMN selection process with the updated CAG information list; or ii) the UE has an emergency PDU session, then the UE performs a local release of all PDU sessions associated with 3GPP access except for the emergency PDU session.

If the configuration update command message indicates "registration requested" in the registration requested bit of the configuration update indication IE and:

a) contains no other parameters or contains at least one of the following parameters: a new allowed NSSAI, a new configured NSSAI or the network slicing subscription change indication, and:

1) an emergency PDU session exists, after the completion of the UE configuration update procedure and the release of the emergency PDU session, the UE releases the existing N1 NAS signalling connection, and start a registration procedure for mobility and periodic registration update; or 2) no emergency PDU Session exists, after the completion of the UE configuration update procedure and the release of the existing N1 NAS signaling connection, the UE starts a registration procedure for mobility and periodic registration update;

b) a MICO indication is included without a new allowed NSSAI or a new configured NSSAI, after the completion of the UE configuration update procedure, the UE starts a registration procedure for mobility and periodic registration update to re-negotiate MICO mode with the network.

The UE receiving the rejected NSSAI in the configuration update command message takes the following actions based on the rejection cause in the rejected S-NSSAI.

"S-NSSAI not available in the current PLMN or SNPN": The UE adds the rejected S-NSSAI(s) in the rejected NSSAI for the current PLMN, and does not attempt to use this S-NSSAI(s) in the current PLMN until switching off the UE, the Universal Integrated Circuit Card (UICC) containing the Universal SIM (USIM) is removed, or the entry of the "list of subscriber data" with the SNPN ID of the current SNPN is updated.

"S-NSSAI not available in the current registration area": The UE adds the rejected S-NSSAI(s) in the rejected NSSAI for the current registration area, and does not attempt to use this S-NSSAI(s) in the current registration area until switching off the UE, the UE moving out of the current registration area, the UICC containing the USIM is removed, or the entry of the "list of subscriber data" with the SNPN ID of the current SNPN is updated.

"S-NSSAI is not available due to the failed or revoked network slice-specific authentication and authorization": The UE adds the rejected S-NSSAI(s) in the rejected NSSAI for the failed or revoked NSSAA, and does not attempt to use this S-NSSAI in the current PLMN over any access until switching off the UE, the UICC containing the USIM is removed, or the entry of the "list of subscriber data" with the SNPN identity of the current SNPN is updated.

If the UE receives a T3447 value IE in the configuration update command message and has indicated "service gap control supported" in the registration request message, then the UE replaces the stored T3447 value with the received value in the T3447 value IE, and if neither zero nor deactivated, uses the received T3447 value with the timer T3447 next time it is started. If the received T3447 value is zero or deactivated, then the UE stop the timer T3447 if running.

If the UE is not in NB-N1 mode, the UE has set the Radio Capability Signaling Optimization (RACS) bit to "RACS supported" in the 5GMM capability IE of the registration request message and the configuration update command message includes the following:

a) a UE radio capability ID deletion indication IE set to "Network-assigned UE radio capability IDs requested": The UE deletes any network-assigned UE radio capability IDs associated with the RPLMN or RSNPN stored at the UE, then the UE initiates a registration procedure for mobility and periodic registration update and b) a UE radio capability ID IE: The UE stores the UE radio capability ID.

If the UE is not currently registered for emergency services and the 5GS registration result IE in the configuration update command message is set to "Registered for emergency services", the UE considers itself registered for emergency services.

Upon receipt of the configuration update complete message, the AMF stops the timer T3555.

If a new 5G-GUTI was included in the configuration update command message, the AMF considers the new 5G-GUTI as valid and the old 5G-GUTI as invalid.

If a new TAI list was included in the configuration update command message, the AMF considers the new TAI list as valid and the old TAI list as invalid.

If a new truncated 5G-S-TMSI configuration was included in the configuration update command message, the AMF considers the new truncated 5G-S-TMSI configuration as valid and the old truncated 5G-S-TMSI configuration as invalid.

If a new service area list was included in the configuration update command message, the AMF considers the new service area list as valid and the old service area list as invalid.

If new allowed NSSAI information was included in the configuration update command message, the AMF considers the new allowed NSSAI information as valid and the old allowed NSSAI information as invalid. If new configured NSSAI information was included in the configuration update command message, the AMF considers the new configured NSSAI information as valid and the old configured information as invalid. If there are active PDU sessions associated with S-NSSAI(s) not included in the new allowed NSSAI, the AMF notifies the SMF(s) associated with these PDU sessions to initiate the network-requested PDU session release procedure.

If "registration requested" was indicated in the registration requested bit of the configuration update indication IE in the configuration update command message and:

a) the configuration update command message contained:

1) an allowed NSSAI, a configured NSSAI or both;

2) the network slicing indication IE with the network slicing subscription change indication set to "Network slicing subscription changed"; or 3) no other parameters; and b) no emergency PDU session has been established for the UE;

then the AMF initiates the release of the N1 NAS signaling connection.

If a LADN information IE was included in the configuration update command message, the AMF shall consider the old LADN information as invalid and the new LADN information as valid, if any. In this case, if the tracking area identity list received in the new LADN information does not include the current TA, the AMF indicates the SMF to release the PDU session for LADN or release the user plane resources for the PDU session for LADN.

If a T3447 value was included in the configuration update command message, the AMF considers the T3447 value as valid, and if neither zero nor deactivated, uses the T3447 value with the timer T3447 next time it is started. If the T3447 value included in the configuration update command message contained an indication that the timer is deactivated or timer value zero, then the AMF stops the timer T3447 if running.

If a CAG information IE was included in the configuration update command message, the AMF considers the new CAG information list as valid and the old CAG information list as invalid.

If a UE radio capability ID IE was included in the configuration update command message, the AMF considers the new UE radio capability ID as valid and the old UE radio capability ID as invalid.

Hereinafter, minimization of service interruption (MINT) will be described. S3.1 and S6.31 of 3GPP TS 22.261 V17.2.0 (2021-03) may be referred.

The most efficient way to prevent interruption of communication services in the event of a disaster is to use roaming. That is, if communication service cannot be received from the communication operator to which the user subscribed due to a disaster, interruption of communication service can be prevented by roaming to another nearby communication operator's network to receive communication service. More specifically, each communication operator may actively install a wireless network and a core network in an area (e.g., one country) for which it is licensed. Different communication operators may construct networks in different ways and/or install core network nodes in different buildings, so even if a disaster occurs, it may not affect all communication operators equally. That is, a problem that occurs in one communication operator may not be equally likely to occur in another communication operator.

In 3GPP Rel-17, a MINT is being discussed in which, in the event of a disaster, a UE receiving a communication service from a communication operator affected by the disaster roams to a network of another communication operator so that the communication service can be continuously received.

Figure 7:
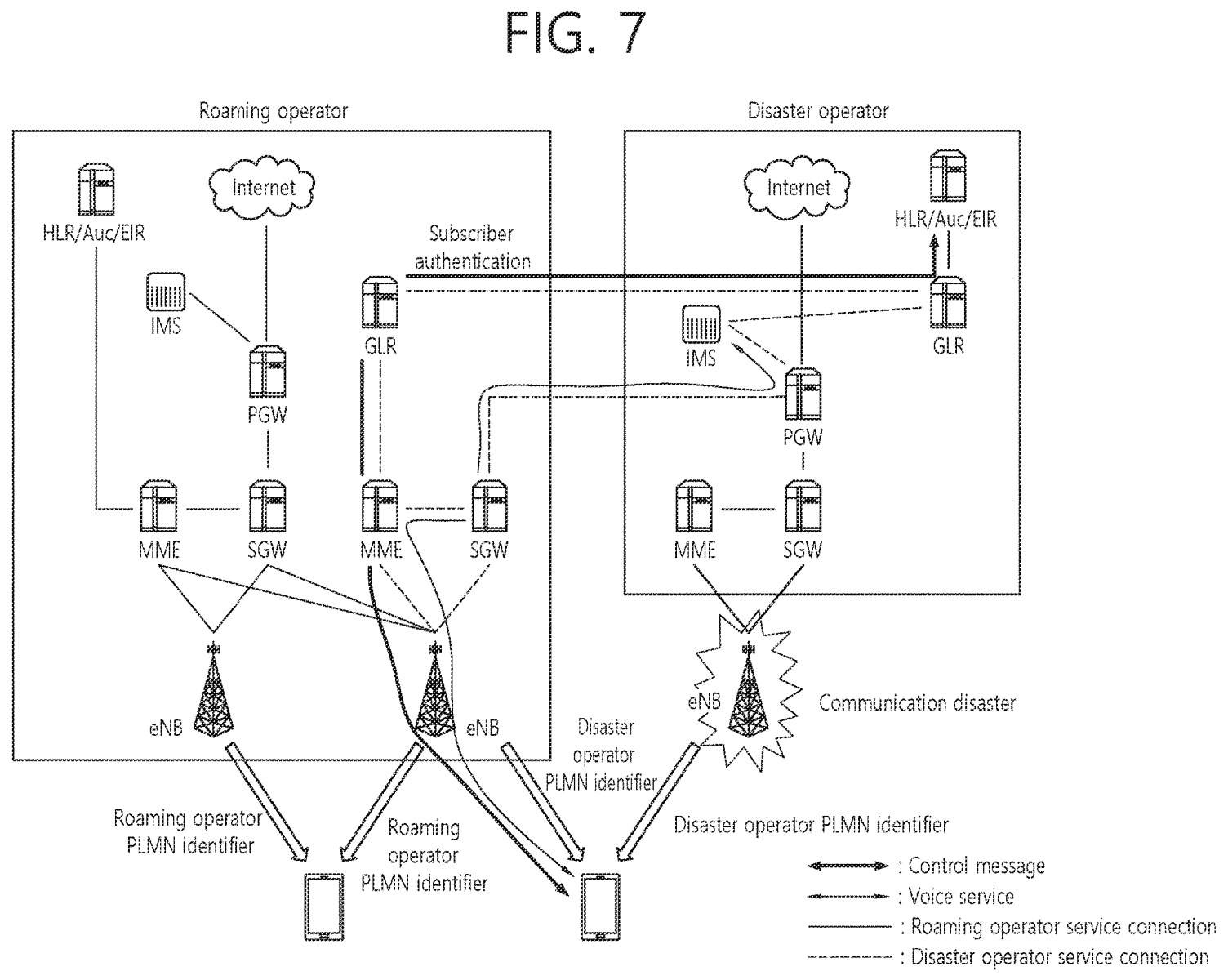

FIG. 7 shows a concept of MINT to which implementations of the present disclosure is applied.

Referring to FIG. 7, when a disaster occurs, the roaming operator can accommodate subscribers of the disaster operator by broadcasting the PLMN identifier of the disaster operator. In addition, in order to accommodate subscribers of the disaster operator in case of a disaster, the PLMN identifier of the disaster operator is registered in the core network of the roaming operator, the wireless network broadcasts the corresponding PLMN identifier in the SIB message, and traffic can be mutually transmitted through the core network between operators.

In order to enable the third party to accommodate its roaming subscribers in the event of a communication disaster of its own and/or to accommodate third-party subscribers in the event of a third-party communication disaster, each operator may build a core network node (e.g., MME, S-GW, P-GW) for disaster roaming.

In normal times, the corresponding system should be ready to accept roaming calls through preliminary network interworking between operators, and may accommodate roaming calls between operators by taking follow-up measures according to occurrence criteria when a communication disaster occurs. Pre- and post-measures may follow consultations between operators.

In FIG. 7, it is shown as an example that MINT is applied in an Evolved Packet System (EPS), but MINT may also be applied in a 5G system.

Regarding MINT, the following terms may be defined.

Disaster Condition: This is the condition that a government decides when to initiate and terminate (e.g., a natural disaster). When this condition applies, users may have the opportunity to mitigate service interruptions and failures.

Disaster Inbound Roamer: A user that (a) cannot get service from the PLMN it would normally be served by, due to failure of service during a Disaster Condition, and (b) is able to register with other PLMNs.

Disaster Roaming: This is the special roaming policy that applies during a Disaster Condition.

Regarding MINT, the following requirements may be considered.

A mobile network may fail to provide service in the event of a disaster (e.g., a fire.) The 5GS may provide functionality to mitigate interruption of service. If there are PLMN operators prepared to offer service, UEs may obtain service from the corresponding PLMN in the event of a disaster. MINT is constrained to a particular time and place. To reduce the impact to the 5G system of supporting Disaster Roaming, the potential congestion resulting from an influx or outflux of Disaster Inbound Roamers is taken into account.

Subject to regulatory requirements or operator's policy, 3GPP system may be able to enable a UE of a given PLMN to obtain connectivity service (e.g., voice call, mobile data service) from another PLMN for the area where a Disaster Condition applies.

The 3GPP system may enable UEs to obtain information that a Disaster Condition applies to a particular PLMN or PLMNs.

If a UE has no coverage of its Home PLMN (HPLMN), then obtains information that a Disaster Condition applies to the UE's HPLMN, the UE may register with a PLMN offering Disaster Roaming service.

The 3GPP system may support means for a PLMN operator to be aware of the area where Disaster Condition applies.

The 3GPP system may be able to support provision of service to Disaster Inbound Roamer only within the specific region where Disaster Condition applies.

The 3GPP system may be able to provide efficient means for a network to inform Disaster Inbound roamers that a Disaster Condition is no longer applicable.

Subject to regulatory requirements or operator's policy, the 3GPP system may support a PLMN operator to be made aware of the failure or recovery of other PLMN(s) in the same country when the Disaster Condition is applies, or when the Disaster Condition is not applicable.

The 3GPP system may be able to provide means to enable a UE to access PLMNs in a forbidden PLMN list if a Disaster condition applies and no other PLMN is available except for PLMNs in the forbidden PLMN list.

The 3GPP system may provide means to enable that a Disaster Condition applies to UEs of a specific PLMN.

The 3GPP system may be able to provide a resource efficient means for a PLMN to indicate to potential Disaster Inbound Roamers whether they can access the PLMN or not.

Disaster Inbound Roamers may perform network reselection when a Disaster Condition has ended.

The 3GPP system may minimize congestion caused by Disaster Roaming.

3GPP system may be able to collect charging information for a Disaster Inbound Roamer with information about the applied disaster condition.

Regarding access control for a UE that satisfies the Disaster Condition, access identity number 4 may be applied. The configuration may be valid for PLMNs that indicate to potential Disaster Inbound Roamers that the UEs can access the PLMN.

Regarding the MINT, network selection may be performed as follows.

At switch on, when in coverage of the last registered PLMN as stored in the SIM/USIM, the UE attaches to that network.

As an option, in automatic selection mode, when no Equivalent HPLMN (EHPLMN) list is present, the UE may select the HPLMN. When the EHPLMN list is present, the UE may select the highest priority EHPLMN among the available EHPLMNs. The operator may able to control the UE behavior by USIM configuration.

As an option, if the UE is in manual network selection mode at switch-on if the last registered PLMN is unavailable and no equivalent PLMN is available, and and the UE finds it is in coverage of either the HPLMN or an EHPLMN then the UE may register on the corresponding HPLMN or EHPLMN. The UE remains in manual network selection mode.

If the UE returns to coverage of the PLMN on which it is already registered (as indicated by the registered PLMN stored in the SIM/USIM), the UE may perform a location update to a new location area if necessary. As an alternative option to this, if the UE is in automatic network selection mode and it finds coverage of the HPLMN or any EHPLMN, the UE may register on the HPLMN (if the EHPLMN list is not present) or the highest priority EHPLMN of the available EHPLMNs (if the EHPLMN list is present) and not return to the last registered PLMN. If the EHPLMN list is present and not empty, it may be used. The operator may be able to control by USIM configuration whether a UE that supports this option shall follow this alternative behavior.

The default behavior for a UE is to select the last registered PLMN.

If there is no registered PLMN stored in the SIM/USIM, or if this PLMN is unavailable and no equivalent PLMN is available, or the attempted registration fails, the UE may follow one of the following procedures for network selection.

A) Automatic Network Selection Mode

The UE may select and attempt registration on other PLMNs, if available and allowable, if the location area is not in the list of "forbidden LAs for roaming" and the tracking area is not in the list of "forbidden TAs for roaming", in the following order.

i) An EHPLMN if the EHPLMN list is present or the HPLMN (derived from the IMSI) if the EHPLMN list is not present, for preferred access technologies in the order specified. In the case that there are multiple EHPLMNs present then the highest priority EHPLMN is selected.

ii) each entry in the "User Controlled PLMN Selector with Access Technology" data field in the SIM/USIM (in priority order).

iii) each entry in the "Operator Controlled PLMN Selector with Access Technology" data field in the SIM/USIM (in priority order).

iv) other PLMN/access technology combinations with sufficient received signal quality in random order.

v) all other PLMN/access technology combinations in order of decreasing signal quality.

It may be possible to configure a voice capable UE so that it shall not attempt registration on a PLMN if all cells identified as belonging to the PLMN do not support the corresponding voice service.

In the case of a UE operating in UE operation mode A or B, an allowable PLMN is one which is not in the Forbidden PLMN data field in the SIM/USIM. This data field may be extended in the Mobile Equipment (ME) memory. In the case of a UE operating in UE operation mode C, an allowable PLMN is one which is not in the Forbidden PLMN data field in the SIM/USIM or in the list of forbidden PLMNs for GPRS service in the ME. When there is no available PLMN except for PLMNs in the Forbidden PLMN data field in the SIM/USIM, and the available PLMNs indicate that Disaster Condition applies, this PLMN may be considered allowable for registration to the UE while the Disaster Condition is applicable.

If successful registration is achieved, the UE may indicate the selected PLMN.

If registration cannot be achieved on any PLMN and at least one PLMN offering restricted local operator services has been found, the UE may obtain user consent for restricted local operator services and the UE may use a list of preferred PLMNs for restricted local operator services stored in the ME. If none of the preferred PLMNs for restricted local operator services is available, the UE may select any available PLMN offering restricted local operator services. If one of these PLMNs for restricted local operator service is chosen, the UE may indicate the choice. If none are selected, the UE may wait until a new PLMN is detected, or new location areas or tracking areas of an allowed PLMN are found which are not in the forbidden LA or TA list(s), and then repeat the procedure.

If registration cannot be achieved on any PLMN and no PLMN offering restricted local operator services has been found, the UE may indicate "no service" to the user, wait until a new PLMN is detected, or new location areas or tracking areas of an allowed PLMN are found which are not in the forbidden LA or TA list(s), and then repeat the procedure. When registration cannot be achieved, different (discontinuous) PLMN search schemes may be used in order to minimize the access time while maintaining battery life, e.g. by prioritizing the search in favor of Broadcast Control Channel (BCCH) carriers which have a high probability of belonging to an available and allowable PLMN.

B) Manual Network Selection Mode

The UE may indicate PLMNs, including Forbidden PLMNs, which are available. If there are none, this may also be indicated. The HPLMN of the user may provide on the USIM additional information about the available PLMNs, if this is provided then the UE may indicate that information to the user. This information, provided as free text may include the followings.

Preferred partner, roaming agreement status, supported services

Furthermore, the UE may indicate whether the available PLMNs are present on one of the PLMN selector lists (e.g., EHPLMN, User Controlled, Operator Controlled or Forbidden) as well as not being present on any of the lists.

For the purpose of presenting the names of the available PLMNs to the user, the ME may use the USIM defined names if available or other PLMN naming rules in priority order (Country/PLMN indication).

Any available PLMNs is presented in the following order.

i) HPLMN (if the EHPLMN list is not present); or if one or more of the EHPLMNs are available, then based on an optional data field on the USIM, either the highest priority available EHPLMN is to be presented to the user or all available EHPLMNs are presented to the user in priority order. If the data field is not present, then only the highest priority available EHPLMN is presented.

ii) PLMNs contained in the "User Controlled PLMN Selector" data field in the SIM/USIM (in priority order)

iii) PLMNs contained in the "Operator Controlled PLMN Selector" data field in the SIM/USIM (in priority order)

iv) other PLMN/access technology combinations with sufficient received signal level in random order v) all other PLMN/access technology combinations in order of decreasing signal strength.

If a PLMN does not support voice services, then this is indicated to the user.

The user may select the desired PLMN and the UE attempts registration on this PLMN (This may take place at any time during the presentation of PLMNs).

If registration cannot be achieved on any PLMN and at least one PLMN offering restricted local operator services has been found, the UE may obtain user consent for restricted local operator services and offer the user to select one of these networks. If one of these networks is selected, the UE may indicate the selected PLMN, wait until a new PLMN is detected, or new location areas or tracking areas of an allowed PLMN are found which are not in the forbidden LA or TA list(s), and then repeat the procedure.

If the registration cannot be achieved on any PLMN and no PLMN offering restricted local operator services is selected, the UE may indicate "No Service". The user may then select and attempt to register on another or the same PLMN following the above procedure. The UE shall not attempt to register on a PLMN which has not been selected by the user.

Once the UE has registered on a PLMN selected by the user, the UE does not automatically register on a different PLMN unless:

i) The new PLMN is declared as an equivalent PLMN by the registered PLMN; or, ii) The user selects automatic mode.

If a PLMN is selected but the UE cannot register on it because registration is rejected with the cause "PLMN not allowed", the UE may add the PLMN to the Forbidden PLMN list. The UE shall not re-attempt to register on that network unless the same PLMN is selected again by the user.

If a PLMN is selected but the UE cannot register for Packet Switched (PS) services on it because registration is rejected with the cause "GPRS services not allowed in this PLMN", the UE shall not re-attempt to register for E-UTRAN or UTRAN PS or GSM EDGE Radio Access Network (GERAN) PS on that network. The PLMN is added to the list "Forbidden PLMN's for GPRS services". The UE shall not re-attempt to register for E-UTRAN or UTRAN PS or GERAN PS on that network unless the same PLMN is selected again by the user. The reception of the cause "GPRS services not allowed in this PLMN", does not affect the CS service.

If a PLMN is selected but the UE cannot register on it for other reasons, the UE may, upon detection of a new LA (not in a forbidden LA list) of the selected PLMN, attempt to register on the PLMN.

If the UE is registered on a PLMN but loses coverage, different (discontinuous) carrier search schemes may be used to minimize the time to find a new valid BCCH carrier and maintain battery life, e.g. by prioritizing the search in favor of BCCH carriers of the registered PLMN.

When a registration attempt by the UE is rejected by a network with an indication of "permanent" PLMN restriction, the PLMN identity may be written to a list of Forbidden PLMNs stored in a data field in the SIM/USIM.

If a successful registration is achieved on a PLMN in the Forbidden PLMN list, the corresponding PLMN may be deleted from the list. However, if successful registration is achieved on a PLMN in the Forbidden PLMN list while Disaster Condition applies, the PLMN may not be deleted from Forbidden PLMN list.

When in automatic mode, the UE may indicate any PLMNs which will not be selected due to their presence in the Forbidden PLMN list.

If a UE receives an equivalent PLMN list containing a PLMN which is included in the Forbidden PLMN list, this PLMN may be removed from the equivalent PLMN list before this is stored by the UE.

When a disaster situation occurs in a specific PLMN (hereinafter referred to as the first PLMN) (i.e., when the disaster condition is satisfied), disaster roaming is applied so that the UE can receive disaster roaming service from the nearby PLMN (hereinafter referred to as the second PLMN) supporting disaster roaming. Thereafter, the first PLMN may be restored while the UE receives disaster roaming service through the second PLMN. In this case, the network should inform the UE receiving the disaster roaming service of the recovery of the first PLMN (i.e., the disaster condition is no longer satisfied) through the first PLMN and/or the second PLMN.

The fact that the first PLMN has been restored may be informed while the UE is being provided with a voice service through the second PLMN. In this case, the second PLMN may deregister all of the UEs introduced from the first PLMN, i.e., disaster inbound roamers, from the second PLMN. Alternatively, as soon as the recovery of the first PLMN is notified, the UE may immediately stop the service being provided from the second PLMN, perform PLMN selection, and move to the restored first PLMN. In either case, the service currently being provided is interrupted, which can deteriorate the user experience.

Hereinafter, according to implementations of the present disclosure, while the UE is receiving disaster roaming service from the second PLMN when a disaster occurs in the first PLMN, a method of minimizing interruption of a communication service provided to the UE by efficiently notifying the UE of recovery of the first PLMN is described.

Hereinafter, UE and terminal may be used interchangeably. Various implementations and/or embodiments of the present disclosure to be described below may be applied to various services, such as eMBB, V2X communication, public safety, IoT, etc. In addition, various implementations and/or embodiments of the present disclosure to be described below may be applied to various types of terminals, e.g., smart phones, vehicles, IoT terminals, robots, etc.

Various implementations and/or embodiments of the present disclosure to be described below may be individually performed, or two or more may be combined to be performed in a complex manner. In addition, combinations of one or more actions/configurations/steps of various implementations and/or embodiments of the present disclosure described below may be performed.

According to implementations of the present disclosure, the AMF of the second PLMN may send a configuration update command message to the UE. In this case, the configuration update command message may include information indicating that the disaster situation of the first PLMN (i.e., HPLMN) has ended. Upon receiving the configuration update command message, the UE recognizes that the disaster situation has ended in the HPLMN and responds with a configuration update complete message, but may wait until a service (e.g., voice service) currently being provided in the second PLMN is terminated. Thereafter, when the service provided by the second PLMN is terminated, the UE may immediately deregister with the second PLMN and select the HPLMN again through PLMN selection.

According to implementations of the present disclosure, the AMF of the second PLMN may send a configuration update command message to the UE. In this case, the configuration update command message may include only "registration requested" without other information/parameters. Upon receiving the configuration update command message, the UE may respond with a configuration update complete message when a service (e.g., voice service) currently being provided by the second PLMN is terminated. When the AMF of the second PLMN performs NAS signaling connection release, the UE may transmit a registration request message to the AMF of the second PLMN again. The AMF of the second PLMN may respond to this with a registration reject message. The registration reject message may include the MM cause value #xx as the rejection cause, and the MM cause value #xx may indicate that the disaster condition has ended in the first PLMN (i.e., HPLMN) and accordingly, the disaster roaming service cannot be provided in the second PLMN any longer. Upon receiving the registration reject message, the UE may transition the MM state to 5GMM.DEREGISTERED for the second PLMN and select the HPLMN by performing PLMN selection.

According to implementations of the present disclosure, when the UE receives information indicating that the disaster situation has ended in the first PLMN, the UE may update that the internally set disaster situation has ended. If the second PLMN was included in the forbidden PLMN list before the disaster situation, the UE may again include the second PLMN in the forbidden PLMN list.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 8 shows an example of a method performed by a UE to which implementations of the present disclosure is applied.

In step S800, the method includes registering in a disaster roaming PLMN and receiving a disaster roaming service.

In step S810, the method includes receiving a Configuration Update Command message including information indicating that a disaster condition of a HPLMN has ended from the disaster roaming PLMN.

In step S820, the method includes waiting until a service being received from the disaster roaming PLMN is ended.

In step S830, the method includes, after the service received from the disaster roaming PLMN is ended, performing a deregistration procedure with the disaster roaming PLMN based on the information indicating that the disaster condition of the HPLMN is ended.

In step S840, the method includes selecting the HPLMN and performing a registration with the HPLMN.

In some implementations, the method may further comprise transmitting a Configuration Update Complete message in response to the Configuration Update Command message to an AMF of the disaster roaming PLMN.

In some implementations, the method may further comprise including the disaster roaming PLMN in a forbidden PLMN list.

In some implementations, the method may further comprise updating an internally set disaster situation being ended based on the information indicating that the disaster condition of the HPLMN has ended.

In some implementations, the Configuration Update Command message may include a configuration update indication IE with a registration requested bit set to "registration requested". In this case, a registration may not be performed with the disaster roaming PLMN regardless of the registration requested bit set to "registration requested". And, a NAS signaling connection release may not be performed regardless of the registration requested bit set to "registration requested".

In some implementations, the UE may communicate with at least one of a mobile device, a network and/or an autonomous vehicle other than the UE.

Furthermore, the method in perspective of the UE described above in FIG. 8 may be performed by the first wireless device 100 shown in FIG. 2, the wireless device 100 shown in FIG. 3, and/or the UE 100 shown in FIG. 4.

More specifically, the UE comprises at least one transceiver, at least one processor, and at least one memory operably connectable to the at least one processor. The at least one memory stores instructions to cause the at least one processor to perform operations below.

The UE registers in a disaster roaming PLMN and receives a disaster roaming service.

The UE receives a Configuration Update Command message including information indicating that a disaster condition of a HPLMN has ended from the disaster roaming PLMN.

The UE waits until a service being received from the disaster roaming PLMN is ended.

The UE, after the service received from the disaster roaming PLMN is ended, performs a deregistration procedure with the disaster roaming PLMN based on the information indicating that the disaster condition of the HPLMN is ended.

The UE selects the HPLMN and performs a registration with the HPLMN.

In some implementations, the operations may further comprise transmitting a Configuration Update Complete message in response to the Configuration Update Command message to an AMF of the disaster roaming PLMN.

In some implementations, the operations may further comprise including the disaster roaming PLMN in a forbidden PLMN list.

In some implementations, the operations may further comprise updating an internally set disaster situation being ended based on the information indicating that the disaster condition of the HPLMN has ended.

In some implementations, the Configuration Update Command message may include a configuration update indication IE with a registration requested bit set to "registration requested". In this case, a registration may not be performed with the disaster roaming PLMN regardless of the registration requested bit set to "registration requested". And, a NAS signaling connection release may not be performed regardless of the registration requested bit set to "registration requested".

Furthermore, the method in perspective of the UE described above in FIG. 8 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, a processing apparatus operating in a wireless communication system comprises at least one processor, and at least one memory operably connectable to the at least one processor. The at least one processor is adapted to perform operations comprising: registering in a disaster roaming PLMN and receiving a disaster roaming service, obtaining a Configuration Update Command message including information indicating that a disaster condition of a HPLMN has ended from the disaster roaming PLMN, waiting until a service being received from the disaster roaming PLMN is ended, after the service received from the disaster roaming PLMN is ended, performing a deregistration procedure with the disaster roaming PLMN based on the information indicating that the disaster condition of the HPLMN is ended, and selecting the HPLMN and performing a registration with the HPLMN.

Furthermore, the method in perspective of the UE described above in FIG. 8 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, CRM stores instructions to cause at least one processor to perform operations. The operations comprise: registering in a disaster roaming PLMN and receiving a disaster roaming service, obtaining a Configuration Update Command message including information indicating that a disaster condition of a HPLMN has ended from the disaster roaming PLMN, waiting until a service being received from the disaster roaming PLMN is ended, after the service received from the disaster roaming PLMN is ended, performing a deregistration procedure with the disaster roaming PLMN based on the information indicating that the disaster condition of the HPLMN is ended, and selecting the HPLMN and performing a registration with the HPLMN.

Hereinafter, various implementations of the present disclosure are described in detail.

1. First Implementation

Figure 9:
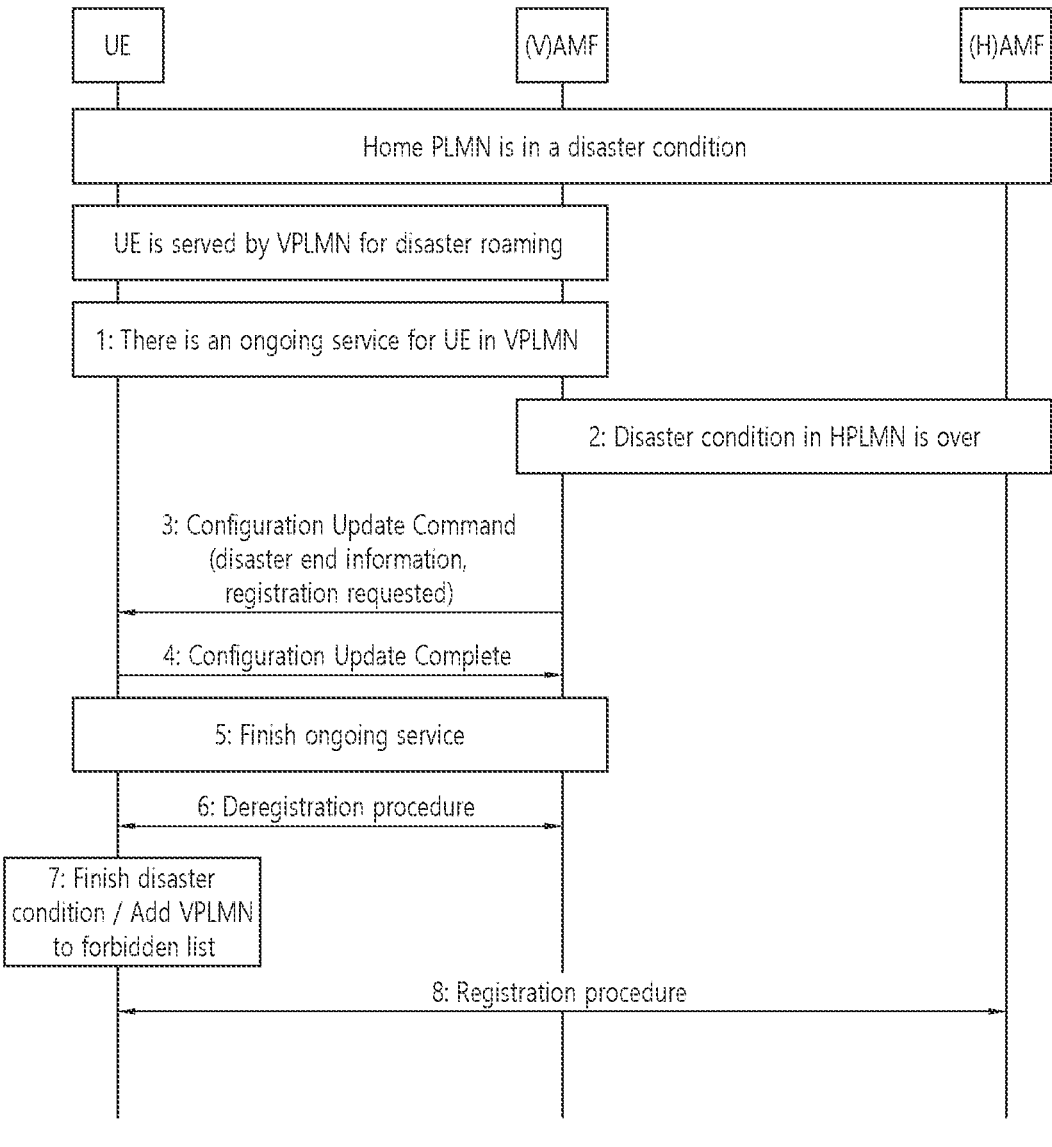
FIG. 9 shows an example of a signaling operation according to the first implementation of the present disclosure.

FIG. 9 shows an example of a signaling operation according to the first implementation of the present disclosure.

The method described in FIG. 8 may correspond to the first implementation.

Referring to FIG. 9, a disaster occurs in a first PLMN (i.e., HPLMN) (i.e., the first PLMN is in a disaster condition), and the UE roams to a second PLMN (i.e., disaster roaming PLMN) according to disaster roaming, and is served by the second PLMN. The operation below is as follows.

Step 1: The UE is currently being served by the second PLMN.

Step 2: The second PLMN recognizes that the disaster condition of the first PLMN has ended.

Step 3: The AMF of the second PLMN transmits the configuration update command message to the UE in a connected state receiving service from the second PLMN. The configuration update command message may include information indicating that the disaster situation in the first PLMN has ended. In addition, the configuration update command message may include a configuration update indication IE with the registration requested bit set to "registration requested".

Step 4: Upon receiving the configuration update command message including information indicating that the disaster situation in the first PLMN has ended, the UE recognizes that the disaster situation in the first PLMN has ended, and responds to the configuration update command message with a configuration update complete message.

Step 5: The UE waits until the service (e.g., voice service) being provided by the second PLMN is terminated.

Step 6: When the service being provided in the second PLMN ends, the UE immediately performs a deregistration procedure for the second PLMN. That is, registration with the second PLMN may not be performed despite receiving the configuration update indication IE with the registration requested bit set to "registration requested" via the configuration update command message. In addition, NAS signaling connection release may not be performed either.

Step 7: The UE may update that the internally set disaster situation is over. If the second PLMN was included in the forbidden PLMN list before the disaster situation, the UE may include the second PLMN in the forbidden PLMN list again based on the termination of the disaster condition in the first PLMN.

Step 8: The UE may perform PLMN selection to select the first PLMN again.

2. Second Implementation

Figure 10:
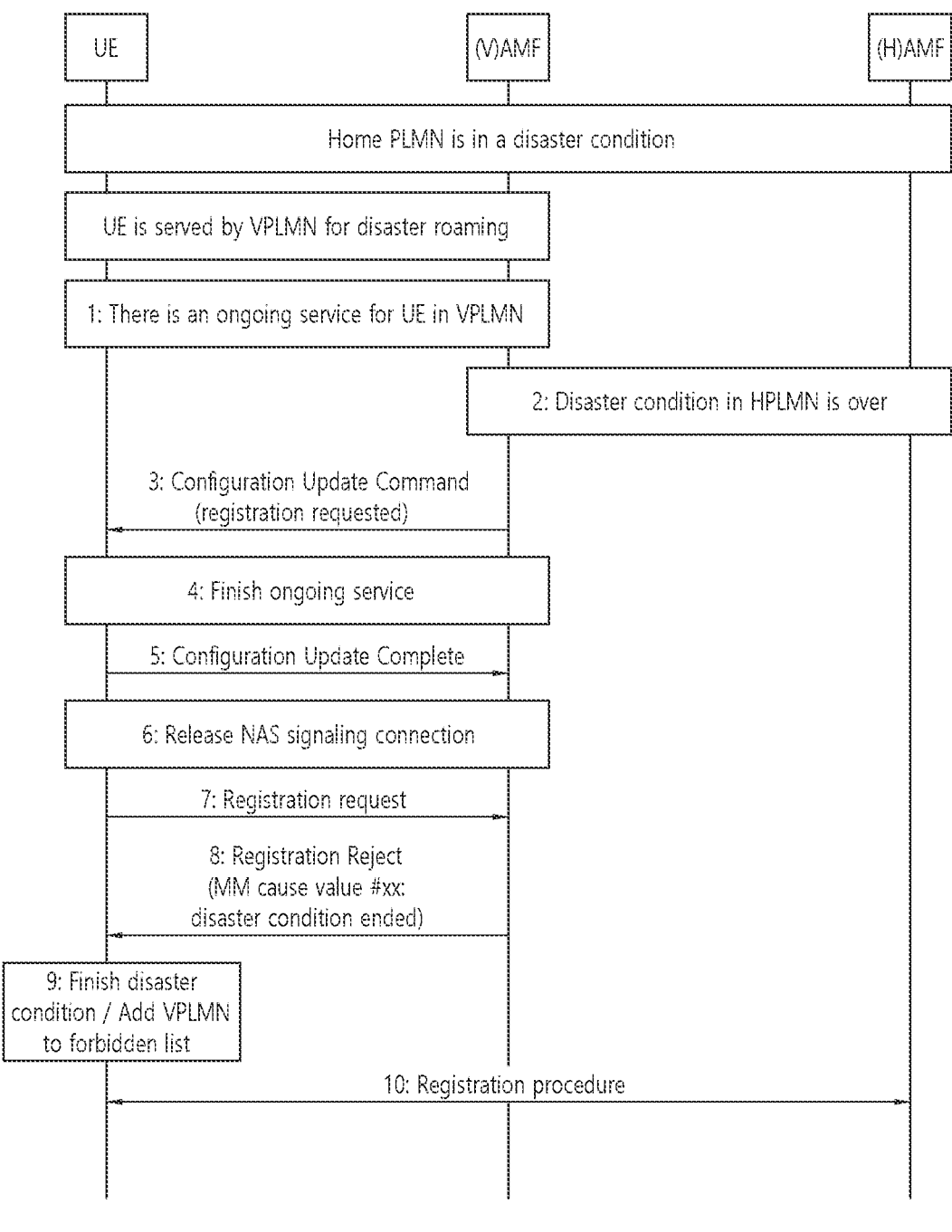
FIG. 10 shows an example of a signaling operation according to the second implementation of the present disclosure.

FIG. 10 shows an example of a signaling operation according to the second implementation of the present disclosure.

Referring to FIG. 10, a disaster occurs in a first PLMN (i.e., HPLMN) (i.e., the first PLMN is in a disaster condition), and the UE roams to a second PLMN (i.e., disaster roaming PLMN) according to disaster roaming, and is served by the second PLMN.

The operation below is as follows.

Step 1: The UE is currently being served by the second PLMN.

Step 2: The second PLMN recognizes that the disaster condition of the first PLMN has ended.

Step 3: The AMF of the second PLMN transmits the configuration update command message to the UE in a connected state receiving service from the second PLMN. Unlike the above-described first implementation, the configuration update command message may not include information indicating that the disaster situation in the first PLMN has ended. That is, the configuration update command message may include only a configuration update indication IE with the registration requested bit set to "registration requested".

Step 4: Upon receiving the configuration update command message, the UE completes a service (e.g., voice service) being provided from the second PLMN.

Step 5: The UE responds to the configuration update command message with a configuration update complete message.

However, since the configuration update procedure itself may fail if the service being provided by the second PLMN is prolonged, the UE may transmit the configuration update complete message within an appropriate time after receiving the configuration update command message in consideration of this. In this case, the service being provided in the second PLMN may inevitably be interrupted according to the transmission of the configuration update complete message.

Step 6: The UE and the second PLMN perform NAS signaling connection release.

Step 7: Upon receiving the configuration update indication IE with the registration requested bit set to "registration requested" via the configuration update command message, the UE transmits the registration request message to the AMF of the second PLMN.

Step 8: In response to the registration request message, the AMF of the second PLMN sends a registration reject message to the UE. The registration reject message may include MM cause value #xx as a cause of rejection. The MM cause value #XX may indicate that the disaster situation has ended in the first PLMN, and accordingly, the disaster roaming service cannot be provided in the second PLMN any longer.

Step 9: Upon receiving the registration reject message including the MM cause value #xx, the UE may transition the MM state for the second PLMN to 5GMM-.DEREGISTERED. In addition, the UE may update that the internally set disaster situation has ended. If the second PLMN was included in the forbidden PLMN list before the disaster situation, the UE may include the second PLMN in the forbidden PLMN list again based on the termination of the disaster condition in the first PLMN.

Step 10: The UE may perform PLMN selection to select the first PLMN again.

The present disclosure can have various advantageous effects.

For example, when a disaster situation ends, a UE that has been using disaster roaming from a disaster roaming communication network can return to the original communication network after normally ending the ongoing service without interruption, thereby improving the user experience of the UE.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method 10 claim(s) and apparatus claim(s) can be combined to be implemented or performed in a method. Other implementations are within the scope of the following claims.

What is claimed is:

1. A method comprising;

based on a disaster condition applying to a first Public Land mobile Network (PLMN), performing a registration procedure for disaster roaming services on a second PLMN;

based on the disaster condition being no longer applicable, receiving a Configuration Update Command message indicating "registration requested" in a registration requested bit of a configuration update indication Information Element (IE) from an Access and mobility Management Function (AMF) of the second PLMN, transmitting a Registration Request message to the AMF of the second PLMN based on the Configuration Update Command message indicating "registration requested" in the registration requested bit of the configuration update indication IE;

receiving a Registration Reject message from the AMF of the second PLMN; and performing a PLMN selection.

2. The method of claim 1, wherein a User Equipment (UE) returns to the first PLMN previously with the disaster condition as a result of the PLMN selection.

3. The method of claim 1, wherein a Configuration Update Complete message is transmitted to the AMF of the second PLMN in response to the Configuration Update Command message.

4. The method of claim 1, wherein the second PLMN is included in a forbidden PLMN list.

5. A User Equipment (UE) comprising:

at least one processor; and at least one memory operably connectable to the at least one processor and storing instructions that, based on being executed by the at least one processor, perform operations comprising:

based on a disaster condition applying to a first Public Land mobile Network (PLMN), performing a registration procedure for disaster roaming services on a second PLMN;

based on the disaster condition being no longer applicable, receiving, via the at least one transceiver, a Configuration Update Command message indicating "registration requested" in a registration requested bit of a configuration update indication Information Element (IE) from an Access and mobility Management Function (AMF) of the second PLMN;

transmitting, via the at least one transceiver, a Registration Request message to the AMF of the second PLMN based on the Configuration Update Command message indicating "registration requested" in the registration requested bit of the configuration update indication IE;

receiving, via the at least one transceiver, a Registration Reject message from the AMF of the second PLMN; and performing a PLMN selection.

6. The UE of claim 5, wherein the UE returns to the first PLMN previously with the disaster condition as a result of the PLMN selection.

7. The UE of claim 5, wherein a Configuration Update Complete message is transmitted to the AMF of the second PLMN in response to the Configuration Update Command message.

8. The UE of claim 5, wherein the second PLMN is included in a forbidden PLMN list.

9. A non-transitory computer readable medium (CRM) storing instructions that, based on being executed by at least one processor, perform operations comprising:

based on a disaster condition applying to a first Public Land mobile Network (PLMN), performing a registration procedure for disaster roaming services on a second PLMN;

based on the disaster condition being no longer applicable, receiving a Configuration Update Command message indicating "registration requested" in a registration requested bit of a configuration update indication Information Element (IE) from an Access and mobility Management Function (AMF) of the second PLMN;

transmitting a Registration Request message to the AMF of the second PLMN based on the Configuration Update Command message indicating "registration requested" in the registration requested bit of the configuration update indication IE;

receiving a Registration Reject message from the AMF of the second PLMN; and performing a PLMN selection.

* * * * *